US011110406B2

(12) United States Patent
De Rudder et al.

(10) Patent No.: US 11,110,406 B2
(45) Date of Patent: Sep. 7, 2021

(54) DOSING AND MIXING ARRANGEMENT FOR USE IN EXHAUST AFTERTREATMENT

(71) Applicant: Donaldson Company, Inc., Minneapolis, MN (US)

(72) Inventors: Korneel De Rudder, Herent (BE); Stéphane Le Merdy, Roullours (FR)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 16/825,586

(22) Filed: Mar. 20, 2020

(65) Prior Publication Data

US 2020/0324254 A1 Oct. 15, 2020

Related U.S. Application Data

(63) Continuation of application No. 16/356,541, filed on Mar. 18, 2019, now Pat. No. 10,603,642, which is a (Continued)

(51) Int. Cl.
*B01F 3/04* (2006.01)
*B01F 5/00* (2006.01)
(Continued)

(52) U.S. Cl.
CPC ........ *B01F 3/04049* (2013.01); *B01F 5/0065* (2013.01); *B01F 5/0451* (2013.01);
(Continued)

(58) Field of Classification Search
CPC .......... B01F 2005/0091; B01F 3/04049; B01F 5/0065; B01F 5/0451; F01N 2240/20;
(Continued)

(56) References Cited

U.S. PATENT DOCUMENTS 2,561,457 A 7/1951 Beales et al.
2,898,202 A 8/1959 Houdry et al.
(Continued)

FOREIGN PATENT DOCUMENTS

DE 40 12 411 A1 10/1991
DE 42 03 807 A1 8/1993
(Continued)

OTHER PUBLICATIONS

Akiyoshi et al., "Development of Efficient Urea-SCR Systems for EPA 2010-Compliant Medium Duty Diesel Vehicles", *SAE International*, 8 pages (Apr. 12, 2011).
(Continued)

*Primary Examiner* — Anthony Ayala Delgado
(74) *Attorney, Agent, or Firm* — Merchant & Gould P.C.

(57) ABSTRACT

A method for causing exhaust gas flow to flow at least 270 degrees in a first direction about a perforated tube using a baffle plate having a main body with a plurality of flow-through openings and a plurality of louvers positioned adjacent to the flow-through openings. The method includes deflecting a first portion of the exhaust gas flow with the main body of the baffle plate. The method also includes allowing a second portion of the exhaust gas flow to flow through the flow-through openings of the baffle plate. The method also deflects the second portion of the exhaust gas flow at a downstream side of the main body with the louvers hereby causing the second portion of the exhaust gas flow to flow in the first direction about the perforated tube.

22 Claims, 12 Drawing Sheets

Related U.S. Application Data continuation of application No. 15/650,502, filed on Jul. 14, 2017, now Pat. No. 10,245,564, which is a continuation of application No. 14/180,953, filed on Feb. 14, 2014, now Pat. No. 9,707,525.

(60) Provisional application No. 61/765,371, filed on Feb. 15, 2013.

(51) Int. Cl.
| | |
|---|---|
| *B01F 5/04* | (2006.01) |
| *F01N 3/20* | (2006.01) |
| *F01N 3/28* | (2006.01) |
| *F01N 3/08* | (2006.01) |
| *F01N 3/035* | (2006.01) |

(52) U.S. Cl.
CPC ......... *F01N 3/2066* (2013.01); *F01N 3/2892* (2013.01); *B01F 2005/0091* (2013.01); *F01N 3/035* (2013.01); *F01N 3/0842* (2013.01); *F01N 2240/20* (2013.01); *F01N 2470/04* (2013.01); *F01N 2470/18* (2013.01); *F01N 2610/02* (2013.01); *Y02T 10/12* (2013.01)

(58) Field of Classification Search
CPC ............. F01N 2470/04; F01N 2470/18; F01N 2610/02; F01N 3/035; F01N 3/0842; F01N 3/2066; F01N 3/2892; Y02T 10/12
See application file for complete search history.

(56) References Cited

U.S. PATENT DOCUMENTS

| | | | |
|---|---|---|---|
| 2,946,651 A | 7/1960 | Houdry et al. |
| 3,048,376 A | 8/1962 | Howald |
| 3,072,457 A | 1/1963 | Bloch |
| 3,779,335 A | 12/1973 | Chelminski |
| 3,797,240 A | 3/1974 | Inoue et al. |
| 3,835,645 A | 9/1974 | Zoleta |
| 3,863,678 A | 2/1975 | Pettersson et al. |
| 3,867,508 A | 2/1975 | Hass |
| 3,964,875 A | 6/1976 | Chang |
| 4,498,786 A | 2/1985 | Ruscheweyh |
| 4,538,701 A | 9/1985 | Lowery et al. |
| 4,902,487 A | 2/1990 | Cooper et al. |
| 4,916,897 A | 4/1990 | Hayashi et al. |
| 5,138,834 A | 8/1992 | Maund |
| 5,272,871 A | 12/1993 | Oshima et al. |
| 5,315,824 A | 5/1994 | Takeshima |
| 5,489,153 A | 2/1996 | Berner et al. |
| 5,540,897 A | 7/1996 | Chu et al. |
| 5,601,792 A | 2/1997 | Hug et al. |
| 5,653,105 A | 8/1997 | Noirot et al. |
| 5,662,869 A | 9/1997 | Abe et al. |
| 5,693,299 A | 12/1997 | Chopin et al. |
| 5,701,735 A | 12/1997 | Kawaguchi |
| 5,772,972 A | 6/1998 | Hepburn et al. |
| 5,884,474 A | 3/1999 | Topsøe |
| 5,916,134 A | 6/1999 | Yang et al. |
| 5,941,069 A | 8/1999 | Heath |
| 5,992,141 A | 11/1999 | Berriman |
| 6,041,594 A | 3/2000 | Brenner |
| 6,050,088 A | 4/2000 | Brenner |
| 6,192,677 B1 | 2/2001 | Tost |
| 6,199,375 B1 | 3/2001 | Russell |
| 6,294,141 B1 | 9/2001 | Twigg et al. |
| 6,312,650 B1 | 11/2001 | Frederiksen et al. |
| 6,314,722 B1 | 11/2001 | Matros et al. |
| 6,401,449 B1 | 6/2002 | Hofmann |
| 6,442,933 B2 | 9/2002 | Rusch |
| 6,444,177 B1 | 9/2002 | Müller et al. |
| 6,449,947 B1 | 9/2002 | Liu et al. |
| 6,539,708 B1 | 4/2003 | Hofmann et al. |
| 6,546,717 B1 | 4/2003 | Chandler et al. |
| 6,606,854 B1 | 8/2003 | Siefker |
| 6,680,037 B1 | 1/2004 | Allansson |
| 6,689,327 B1 | 2/2004 | Reck |
| 6,712,869 B2 | 3/2004 | Cheng |
| 6,722,123 B2 | 4/2004 | Liu |
| 6,722,124 B2 | 4/2004 | Pawson et al. |
| 6,770,252 B2 | 8/2004 | Cheng |
| 6,824,743 B1 | 11/2004 | Pawson et al. |
| 6,863,874 B1 | 3/2005 | Twigg |
| 6,889,500 B1 | 5/2005 | Martinez |
| 6,935,105 B1 | 8/2005 | Page et al. |
| 7,104,251 B2 | 9/2006 | Kim |
| 7,168,241 B2 | 1/2007 | Rudelt et al. |
| 7,448,206 B2 | 11/2008 | Meingast et al. |
| 7,482,986 B2 | 1/2009 | Wu et al. |
| 7,537,083 B2 | 5/2009 | Frederiksen |
| 7,581,389 B2 | 9/2009 | Crawley et al. |
| 7,712,305 B2 | 5/2010 | Kapsos et al. |
| 7,877,983 B2 | 2/2011 | Kunkel et al. |
| 7,896,645 B2 | 3/2011 | Loving |
| 8,015,802 B2 | 9/2011 | Nishiyama et al. |
| 8,033,104 B2 | 10/2011 | Zhang |
| 8,359,838 B2 | 1/2013 | Yamazaki et al. |
| 8,402,752 B2 | 3/2013 | Kowada |
| 8,499,548 B2 | 8/2013 | De Rudder et al. |
| 8,539,761 B2 | 9/2013 | Lebas et al. |
| 9,707,525 B2 | 7/2017 | De Rudder et al. |
| 10,245,564 B2 | 4/2019 | De Rudder et al. |
| 10,603,642 B2 | 3/2020 | De Rudder et al. |
| 2002/0053287 A1 | 5/2002 | Natarius |
| 2002/0162322 A1 | 11/2002 | Ganzmann et al. |
| 2003/0003029 A1 | 1/2003 | Rogers et al. |
| 2003/0079467 A1 | 5/2003 | Liu et al. |
| 2003/0108457 A1 | 6/2003 | Gault et al. |
| 2003/0226539 A1 | 12/2003 | Kim |
| 2004/0040782 A1 | 3/2004 | Frederiksen |
| 2004/0237511 A1 | 12/2004 | Ripper et al. |
| 2006/0218902 A1 | 10/2006 | Arellano et al. |
| 2006/0275192 A1 | 12/2006 | Gabrielsson et al. |
| 2007/0101703 A1 | 5/2007 | Kanaya et al. |
| 2007/0144158 A1 | 6/2007 | Girard |
| 2007/0189936 A1 | 8/2007 | Suwabe et al. |
| 2007/0274877 A1 | 11/2007 | Bush et al. |
| 2008/0041052 A1 | 2/2008 | Doring et al. |
| 2008/0141662 A1 | 6/2008 | Schuster et al. |
| 2008/0245060 A1 | 10/2008 | Stieglbauer |
| 2009/0000287 A1 | 1/2009 | Blaisdell et al. |
| 2009/0019843 A1 | 1/2009 | Levin et al. |
| 2009/0173063 A1 | 7/2009 | Boorse et al. |
| 2009/0205327 A1 | 8/2009 | Kabat et al. |
| 2009/0313979 A1 | 12/2009 | Kowada |
| 2009/0320726 A1 | 12/2009 | Loving |
| 2010/0101222 A1 | 4/2010 | Oesterle et al. |
| 2010/0107612 A1 | 5/2010 | Yamazaki et al. |
| 2010/0139258 A1 | 6/2010 | Hackett et al. |
| 2010/0199645 A1 | 8/2010 | Telford |
| 2010/0212292 A1 | 8/2010 | Rusch et al. |
| 2010/0212301 A1 | 8/2010 | De Rudder et al. |
| 2010/0263359 A1 | 10/2010 | Haverkamp et al. |
| 2011/0094206 A1 | 4/2011 | Liu et al. |
| 2011/0113759 A1 | 5/2011 | Tilinski et al. |
| 2011/0167810 A1 | 7/2011 | Lebas et al. |
| 2011/0219755 A1 | 9/2011 | Muller-Haas |
| 2011/0308234 A1 | 12/2011 | De Rudder et al. |
| 2013/0064725 A1* | 3/2013 | Kageyama ............ B01D 53/92 422/168 |
| 2014/0116037 A1 | 5/2014 | Lebas et al. |

FOREIGN PATENT DOCUMENTS

| | | |
|---|---|---|
| DE | 199 55 013 A1 | 5/2001 |
| DE | 44 17 238 C2 | 3/2003 |
| DE | 20 2006 011 281 U1 | 9/2006 |
| DE | 10 2004 020 138 B4 | 2/2007 |
| DE | 10 2006 019 052 A1 | 10/2007 |
| DE | 10 2007 009 890 A1 | 9/2008 |
| DE | 10 2007 012 790 A1 | 9/2008 |
| DE | 20 2007 010 324 U1 | 1/2009 |
| DE | 10 2008 009 564 A1 | 8/2009 |

(56) References Cited

FOREIGN PATENT DOCUMENTS

| | | |
|---|---|---|
| DE | 10 2008 031 136 A1 | 1/2010 |
| DE | 10 2008 048 796 A1 | 3/2010 |
| DE | 10 2009 053 950 A1 | 5/2011 |
| EP | 0 319 299 A1 | 6/1989 |
| EP | 0 470 361 A1 | 2/1992 |
| EP | 0 555 746 A1 | 8/1993 |
| EP | 0 628 706 A1 | 12/1994 |
| EP | 0 666 099 A1 | 8/1995 |
| EP | 0 758 713 A1 | 2/1997 |
| EP | 0 839 996 A2 | 5/1998 |
| EP | 0 849 441 A1 | 6/1998 |
| EP | 0 862 941 A2 | 9/1998 |
| EP | 1 054 722 A1 | 11/2000 |
| EP | 0 779 415 B1 | 5/2001 |
| EP | 1 262 644 A2 | 12/2002 |
| EP | 1 109 993 B1 | 5/2003 |
| EP | 1 054 139 B1 | 3/2004 |
| EP | 1 712 753 A2 | 10/2006 |
| EP | 1 770 253 A1 | 4/2007 |
| EP | 1 890 016 A2 | 2/2008 |
| EP | 1 947 307 A1 | 7/2008 |
| EP | 1 712 756 B1 | 3/2009 |
| EP | 2 111 916 A1 | 10/2009 |
| EP | 2 128 398 A1 | 12/2009 |
| EP | 1 781 908 B1 | 3/2010 |
| EP | 2 168 672 A1 | 3/2010 |
| EP | 2 204 556 A1 | 7/2010 |
| EP | 2 295 756 A1 | 3/2011 |
| EP | 2 204 556 B1 | 5/2012 |
| EP | 2 465 602 A2 | 6/2012 |
| EP | 1 770 253 B1 | 9/2012 |
| EP | 2 465 602 B1 | 5/2013 |
| EP | 2 128 398 B1 | 12/2013 |
| FI | 20106317 | 12/2010 |
| FI | 20115569 | 6/2011 |
| FR | 2 384 206 | 10/1978 |
| FR | 2 861 137 A1 | 4/2005 |
| FR | 2 891 305 A1 | 3/2007 |
| GB | 2 381 218 A | 4/2003 |
| GB | 2 434 557 A | 8/2007 |
| JP | 11-166410 | 6/1999 |
| JP | 2003-193823 | 7/2003 |
| JP | 2003-232218 | 8/2003 |
| JP | 2005-273564 | 10/2005 |
| JP | 2006-105414 | 4/2006 |
| JP | 2006-205077 | 8/2006 |
| JP | 2008-128093 | 6/2008 |
| JP | 2008-274878 | 11/2008 |
| JP | 2008-309000 | 12/2008 |
| JP | 2009-144614 | 7/2009 |
| JP | 2009-150338 | 7/2009 |
| JP | 2011-99390 | 5/2011 |
| WO | WO 97/01387 | 1/1997 |
| WO | WO 99/44725 | 9/1999 |
| WO | WO 01/04466 A1 | 1/2001 |
| WO | WO 01/42630 A2 | 6/2001 |
| WO | WO 03/004839 A1 | 1/2003 |
| WO | WO 03/036056 A1 | 5/2003 |
| WO | WO 03/104624 A2 | 12/2003 |
| WO | WO 2004/033866 A1 | 4/2004 |
| WO | WO 2004/038192 A1 | 5/2004 |
| WO | WO 2004/113690 A1 | 12/2004 |
| WO | WO 2005/073524 A1 | 8/2005 |
| WO | WO 2006/001855 A2 | 1/2006 |
| WO | WO 2006/009056 A1 | 1/2006 |
| WO | WO 2006/010922 A1 | 2/2006 |
| WO | WO 2006/014129 A1 | 2/2006 |
| WO | WO 2008/024535 A2 | 2/2008 |
| WO | WO 2008/061734 A1 | 5/2008 |
| WO | WO 2008/111254 A1 | 9/2008 |
| WO | WO 2008/144385 A2 | 11/2008 |
| WO | WO 2009/012885 A1 | 1/2009 |
| WO | WO 2009/024815 A2 | 2/2009 |
| WO | WO 2009/157995 A1 | 12/2009 |
| WO | WO 2010/032077 A1 | 3/2010 |
| WO | WO 2010/078052 A1 | 7/2010 |
| WO | WO 2011/106487 A1 | 9/2011 |
| WO | WO 2011/163395 A1 | 12/2011 |

OTHER PUBLICATIONS

Alano et al., "Compact SCR for Passenger Cars", *SAE International*, 9 pages (Apr. 12, 2011).
International Search Report and Written Opinion for PCT/US2014/016532 dated Jun. 3, 2014.
Jungmin Seo, "Aftertreatment Package Design for SCR Performance Optimization", *SAE International*, 7 pages (Apr. 12, 2011).
Opposition mailed Sep. 19, 2017 against EP 2 956 233 B1, which is related to the pending application.
Reply of the Patent Proprietor to the Notice of Opposition for Application No. 14707072.6 (EP 2 956 233) mailed Mar. 6, 2018.
Annex to Communication for Application No. 14707072.6, 8 pages (dated Jul. 30, 2018).
Letter Regarding the Opposition Procedure for Application No. 14707072.6,4 pages (dated Aug. 12, 2019).
Notification Concerning the Date of Oral Proceedings for Application No. 14707072.6, 2 pages (dated Oct. 15, 2019).
Provisional of the minutes, Minutes of the oral proceedings-introduction of the parties, conclusion of the proceedings for Application No. 14707072.6,4 pages (dated Oct. 1, 2020).
Grounds for the decision (Annex) for Application No. 14707072.6, 2.10 pages (dated Jan. 22, 2020).

* cited by examiner

DOSING AND MIXING ARRANGEMENT FOR USE IN EXHAUST AFTERTREATMENT

CROSS-REFERENCE TO RELATED APPLICATIONS

This application is a continuation of application Ser. No. 16/356,541, filed Mar. 18, 2019, now U.S. Pat. No. 10,603,642, which is a continuation of application Ser. No. 15/650,502, filed Jul. 14, 2017, now U.S. Pat. No. 10,245,564, which is a continuation of application Ser. No. 14/180,953, filed Feb. 14, 2014, now U.S. Pat. No. 9,707,525, which application claims the benefit of provisional application Ser. No. 61/765,371, filed Feb. 15, 2013, which applications are incorporated herein by reference in their entirety.

BACKGROUND

Vehicles equipped with internal combustion engines (e.g., diesel engines) typically include exhaust systems that have aftertreatment components such as selective catalytic reduction (SCR) catalyst devices, lean NOx catalyst devices, or lean NOx trap devices to reduce the amount of undesirable gases, such as nitrogen oxides (NOx) in the exhaust. In order for these types of aftertreatment devices to work properly, a doser injects reactants, such as urea, ammonia, or hydrocarbons, into the exhaust gas. As the exhaust gas and reactants flow through the aftertreatment device, the exhaust gas and reactants convert the undesirable gases, such as NOx, into more acceptable gases, such as nitrogen and water. However, the efficiency of the aftertreatment system depends upon how evenly the reactants are mixed with the exhaust gases. Therefore, there is a need for a flow device that provides a uniform mixture of exhaust gases and reactants.

SCR exhaust treatment devices focus on the reduction of nitrogen oxides. In SCR systems, a reductant (e.g., aqueous urea solution) is dosed into the exhaust stream. The reductant reacts with nitrogen oxides while passing through an SCR substrate to reduce the nitrogen oxides to nitrogen and water. When aqueous urea is used as a reductant, the aqueous urea is converted to ammonia which in turn reacts with the nitrogen oxides to covert the nitrogen oxides to nitrogen and water. Dosing, mixing and evaporation of aqueous urea solution can be challenging because the urea and by-products from the reaction of urea to ammonia can form deposits on the surfaces of the aftertreatment devices. Such deposits can accumulate over time and partially block or otherwise disturb effective exhaust flow through the aftertreatment device.

SUMMARY

An aspect of the present disclosure relates to a method for dosing and mixing exhaust gas in exhaust aftertreatment. Another aspect of the present disclosure relates to a dosing and mixing unit for use in exhaust aftertreatment. More specifically, the present disclosure relates to a dosing and mixing unit including a baffle plate configured to direct exhaust gas flow to flow around a perforated mixing tube to effectively mix and dose exhaust gas within a relatively small area.

An aspect of the disclosure includes a method for causing exhaust gas flow to flow at least 270 degrees in a first direction about a perforated tube using a baffle plate. The baffle plate has a main body that defines a plurality of flow-through openings. The baffle plate also includes a plurality of louvers positioned adjacent to the flow-through openings. The main body of the baffle plate has an upstream side and a downstream side. The louvers are positioned at the downstream side of the main body of the baffle plate. The downstream side of the main body of the baffle faces toward the perforated tube. The method includes deflecting a first portion of the exhaust gas flow with the upstream side of the main body of the baffle plate thereby causing the first portion of the exhaust flow to flow around an end of the main body of the baffle plate and around the perforated tube in the first direction. The method also includes allowing a second portion of the exhaust gas flow to flow through the flow-through openings of the baffle plate from the upstream side of the main body to the downstream side of the main body. The method also involves deflecting the second portion of the exhaust gas flow at the downstream side of the main body with the louvers thereby causing the second portion of the exhaust gas flow to flow in the first direction about the perforated tube.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
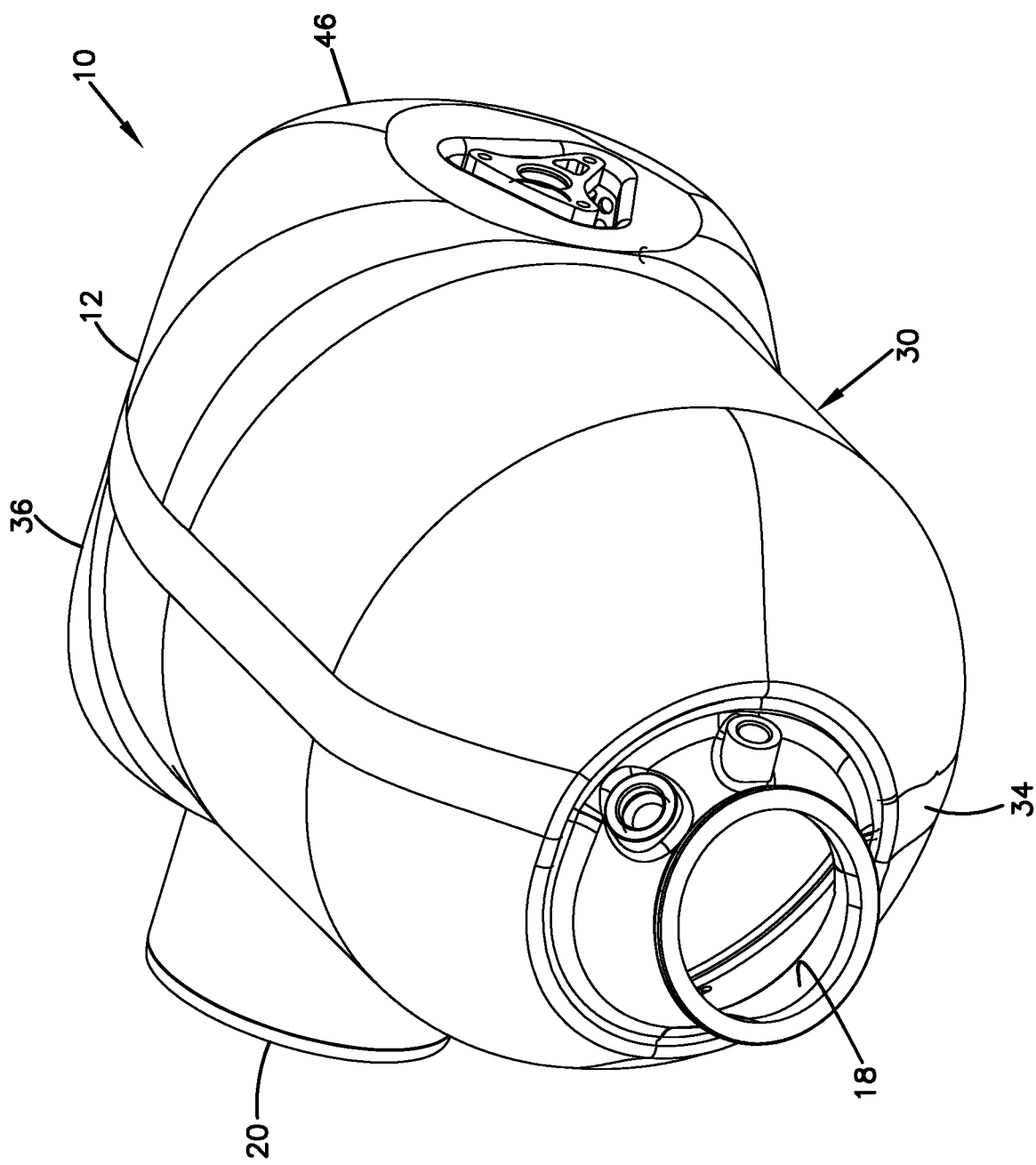
FIG. 1 is a perspective view of a dosing and mixing unit having features that are examples of inventive aspects in accordance with the principles of the present disclosure.
Figure 2:
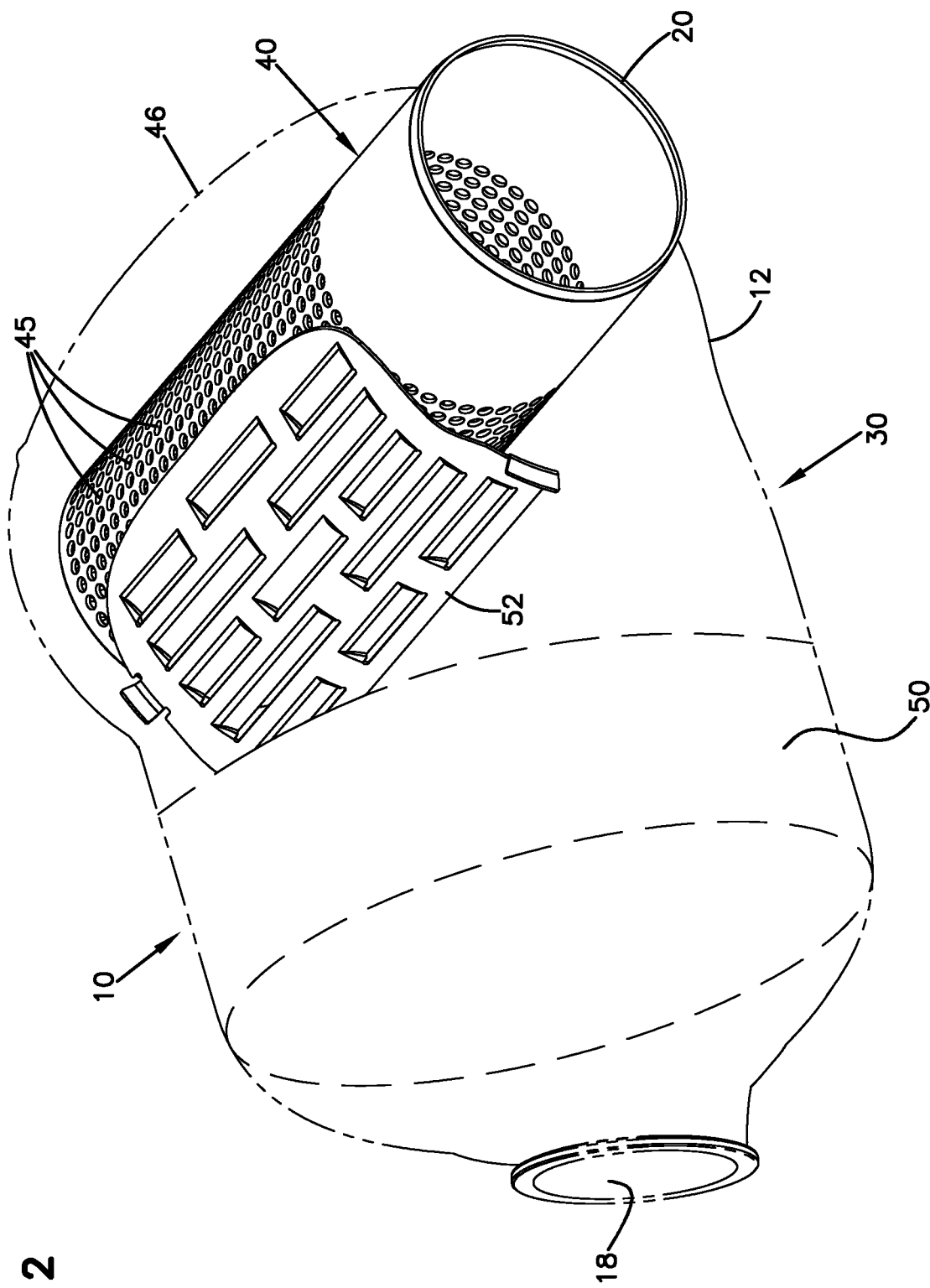
FIG. 2 is a side perspective view of the dosing and mixing unit of FIG. 1 with interior components visible.

FIGS. 1-5 show a dosing and mixing unit 10 in accordance with the principles of the present disclosure. The dosing and mixing unit 10 includes a housing 12 having a housing body 30, an inlet 18, and an outlet 20. An exhaust treatment substrate 50, a perforated tube 40, and a baffle 52 are disposed within the housing 12 (FIG. 2). Exhaust gas G flows from the inlet 18, through the treatment substrate 50, through the baffle 52, and into the tube 40 (see FIG. 4). The baffle 52 is configured to direct the exhaust gas G to flow in a direction d (see FIG. 3) about the perforated tube 40 to enhance swirling within the tube 40. The tube 40 defines the outlet 20 of the unit 10.

Figure 3:
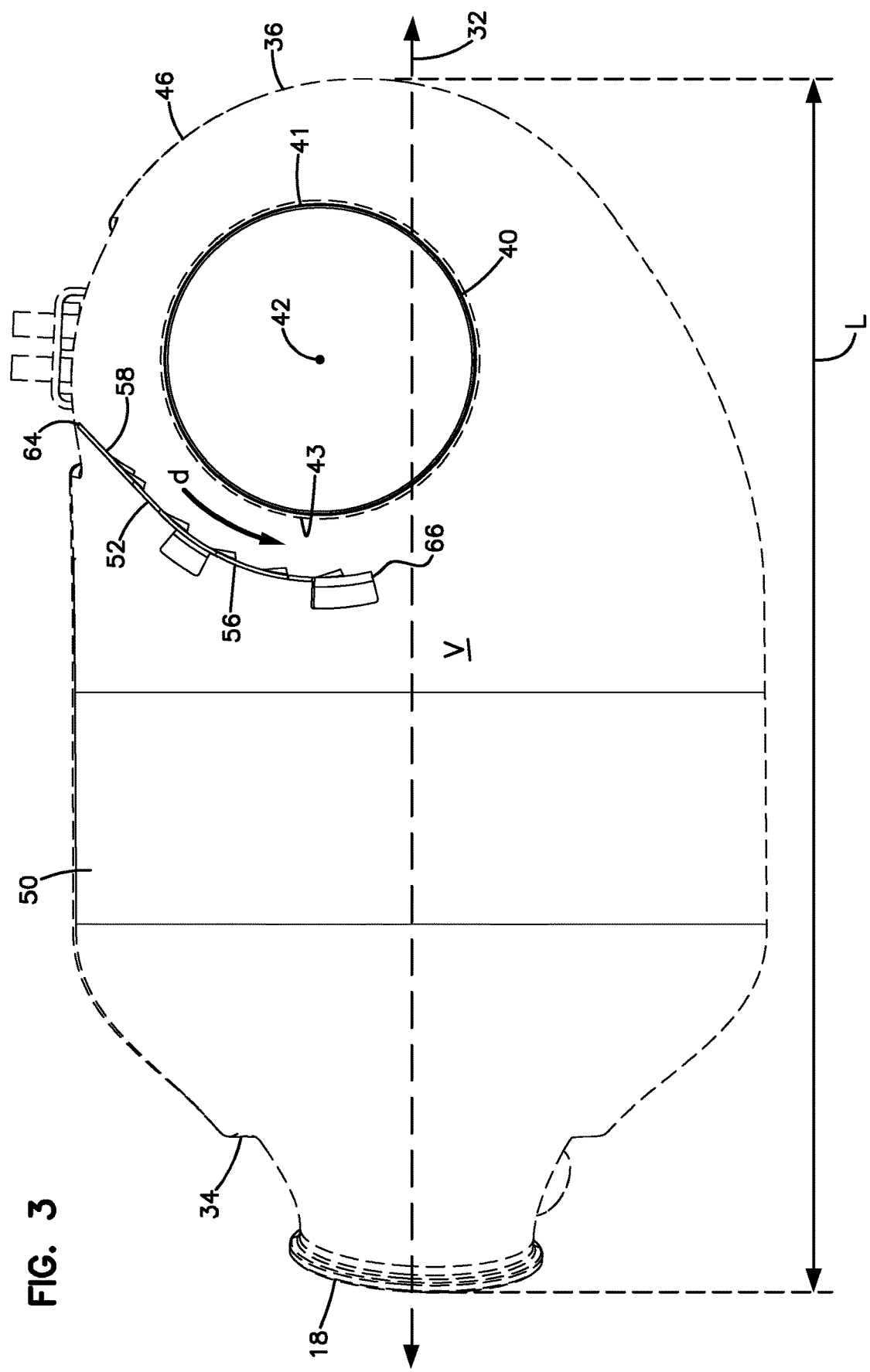
FIG. 3 is a side view of the dosing and mixing unit of FIG. 2.

As shown in FIG. 3, the housing body 30 defines a central housing axis 32 between a first end 34 and a second opposite end 36. A length L of the main housing body 30 extends along the central housing axis 32 between the first and the second ends 34, 36 of the main housing body 30 (FIG. 3). The inlet 18 is adjacent the first end 34 of the main housing body 30 and the outlet 20 is adjacent the second end 36 of the main housing body 30. The exhaust treatment substrate 50 is positioned within the main housing body 30 between the inlet 18 and the perforated tube 40. The main housing body 30 defines an interior volume V (see FIG. 3) that extends between an exhaust treatment substrate 50 and the perforated tube 40. The interior volume V defines a transverse cross-sectional area A that is transverse relative to the central housing axis 32 (see FIG. 9).

The perforated tube 40 is disposed towards the second end of the main housing body 30. In certain embodiments, the second end 36 of the main housing body 30 includes a curved portion 46 that curves partially around the perforated tube 40. As used herein, a "perforated tube" is a conduit having a plurality of side holes. The use of the term "perforated" is not dependent on the method(s) used to make the side holes (i.e., the holes can be made in any way and need not be formed by a stamping/perforation type process). The perforated tube 40 defines a tube axis 42 aligned at an angle θ relative to the central housing axis 32 (see FIG. 5).

Figure 6:
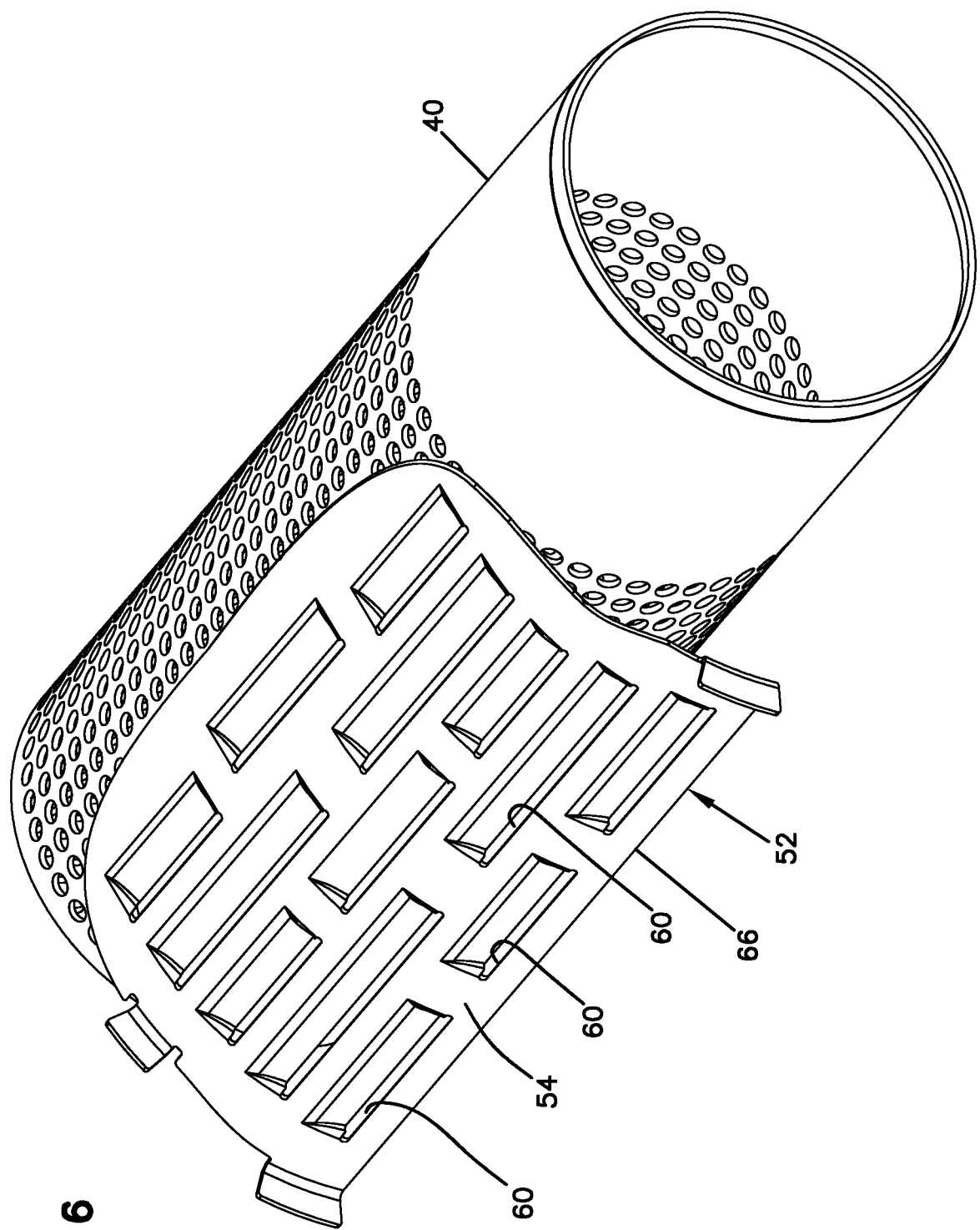
FIG. 6 is a perspective view of an example baffle curving partially around an example perforated tube suitable for use in the dosing and mixing unit of FIG. 2.
Figure 7:
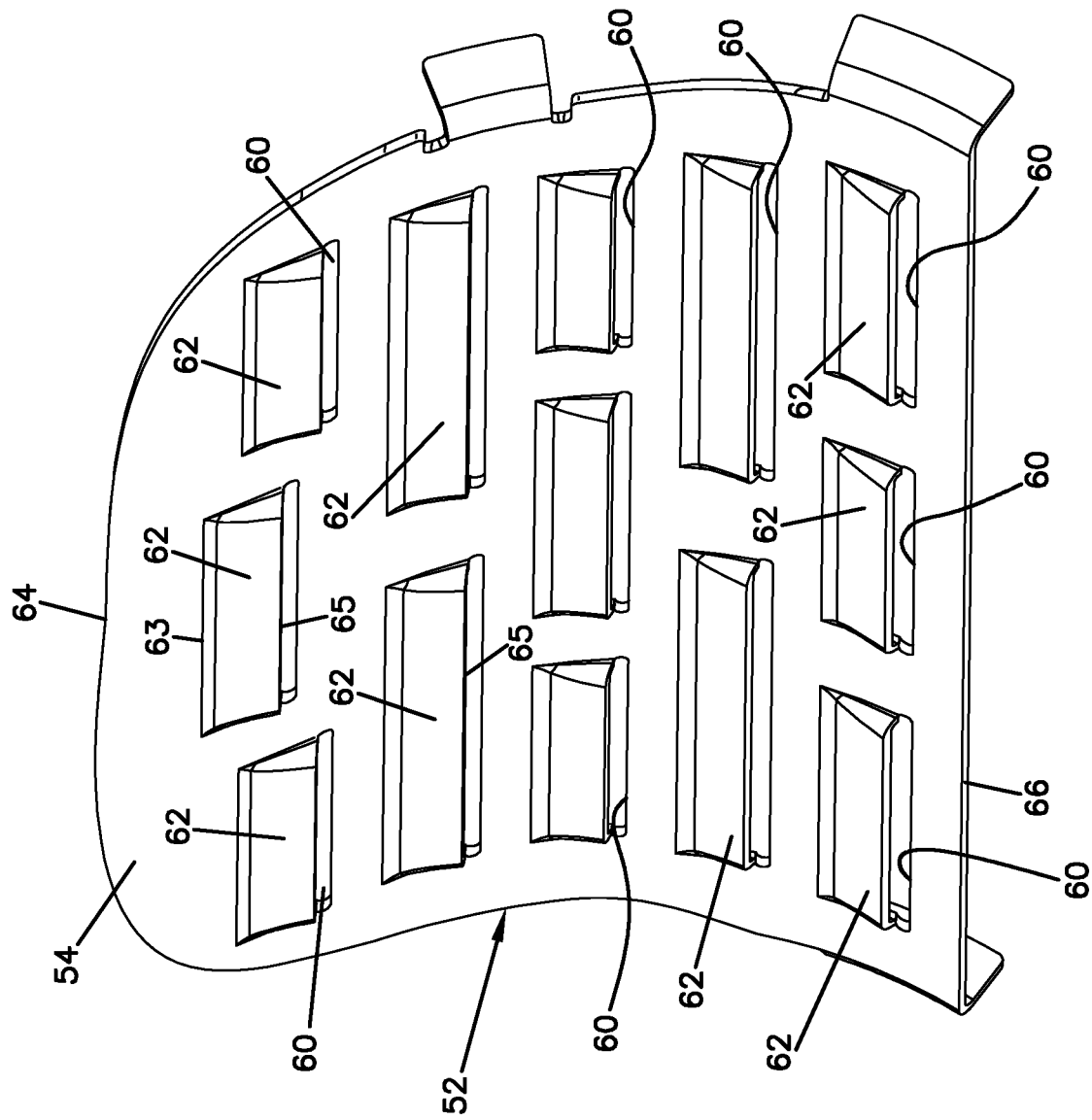
FIG. 7 is a perspective view showing a downstream side of the baffle of FIG. 6.
Figure 8:
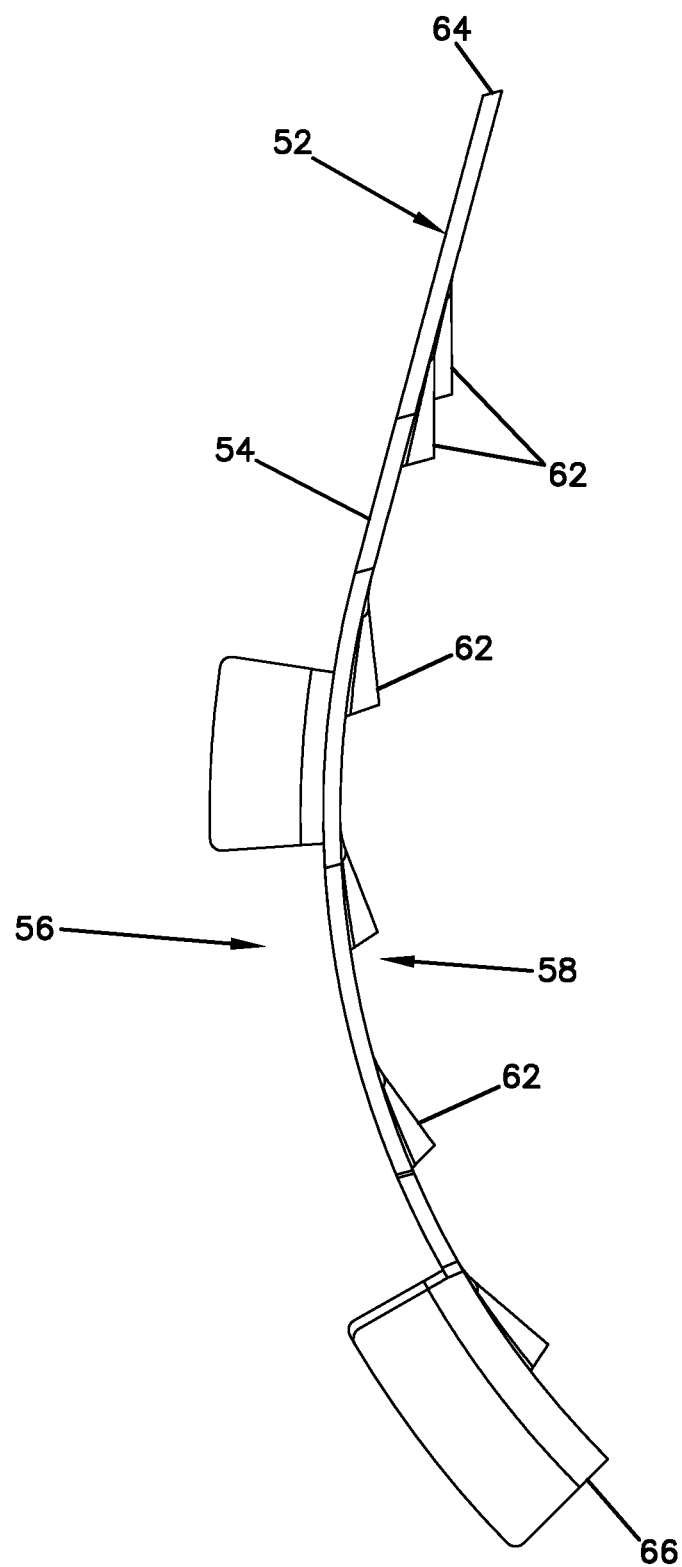
FIG. 8 is a side elevational view of the baffle of FIG. 6.

The baffle plate 52 is positioned within the interior volume V between the perforated tube 40 and the exhaust treatment substrate 50. In certain embodiments, the baffle plate 52 is separate from and not connected to the perforated tube 40. As shown in FIGS. 6-8, the baffle plate 52 includes a main plate body 54 having an upstream side 56 that faces toward the exhaust treatment substrate 50 and a downstream side 58 that faces toward the perforated tube 40 (also see FIG. 3). In certain embodiments, the main body 54 of the baffle plate 52 extends only partially around the perforated tube 40. In certain embodiments, the main body 54 of the baffle plate 52 extends along less than fifty percent of a circumference of the perforated tube 40. In certain embodiments, the main body 54 of the baffle plate 52 extends along less than one-third of a circumference of the perforated tube 40. In certain embodiments, the main body 54 of the baffle plate 52 extends along less than one-quarter of a circumference of the perforated tube 40.

In certain embodiments, the main body 54 of the baffle plate 52 has a curvature defined by an arc having a radius centered on a centerline of the perforated tube 40. In some embodiments, the upstream side 56 of the main body 54 has a convex curvature and the downstream side 58 of the main body 54 has a concave curvature (see FIG. 8). In some of these embodiments, the convex and concave curvatures curve partially around the perforated tube 40 (see FIG. 3).

The main plate body 54 defines a plurality of flow-through openings 60 that extend through the main plate body 54 between the upstream and downstream sides 56, 58 of the main plate body 54. The openings 60 enable treated exhaust gas G to flow through the baffle 52 towards the tube 40 (see FIGS. 4 and 5). In certain embodiments, the perforated tube 40 defines circular openings 45 and the baffle plate 52 defines rectangular openings 60. In certain embodiments, the openings 45 of the perforated tube 40 are smaller in area than the openings 60 in the baffle plate 52.

In accordance with some aspects of the disclosure, the baffle plate 52 also includes one or more louvers 62 positioned adjacent to the flow-through openings 60 of the main plate body 54. In some implementations, the louvers 62 are disposed at the downstream side 58 of the plate body 54. In other implementations, one or more louvers 62 can be positioned at the upstream side 56 or at both the upstream and downstream sides 56, 58 of the plate body 54. In certain embodiments, the louvers 62 have base ends 63 that are integral/unitary with the main body 54 of the baffle plate 52. Free ends 65 of the louvers 62 extend laterally away from the main plate body 54. The louvers 62 direct the gas G passing through the openings 60 in a flow direction d (FIG. 3) around the tube 40. The flow direction d generated by the louvers 62 encourages the swirling exhaust gas G to remain within the perforated tube 40 once the exhaust gas G has entered the perforated tube 40. Treated gas G also flows beneath the free edge 66 of the baffle 52 towards the curved portion 46 of the housing body 30, which further directs the gas G around the tube 40 in the flow direction d (see FIGS. 4 and 5).

In certain embodiments, an exhaust flow path extends 360 degrees about the circumference of the perforated tube 40, and the baffle plate 52 coincides with only a portion the flow path. In certain embodiments an exhaust flow path extends 360 degrees about the circumference of the perforated tube 40, and the baffle plate 52 coincides with less than one-third or less than one-quarter of the flow path. In certain embodiments, the main body 54 of the baffle plate 52 curves around only a portion of the circumference of the perforated tube 40. In certain embodiments, an exhaust flow path extends 360 degrees about the circumference of the perforated tube 40, the exhaust flow travels in a single rotational direction about the perforated tube 40 along the exhaust flow path, the baffle plate 52 coincides with only a first portion the exhaust flow path, and the louvers 62 encourage the flow in the single rotational direction within the first portion of the exhaust flow path and assist in preventing exhaust from exiting the perforated tube 40 along the first portion of the exhaust flow path. In certain embodiments, an exhaust flow path extends 360 degrees about the circumference of the perforated tube 40, the exhaust flow travels in a single rotational direction about the perforated tube 40 along the exhaust flow path, the baffle plate 52 coincides with only a first portion the exhaust flow path, the louvers 62 of the baffle plate 52 function as first swirl structures that encourage the flow in the single rotational direction within the first portion of the exhaust flow path, and a curved portion 46 of an outer housing 30 that curves along a portion of the perforated tube 40 and coincides with a second portion of the exhaust flow path functions as a second swirl structure that encourages the flow in the single rotational direction within the second portion of the exhaust flow path.

Figure 4:
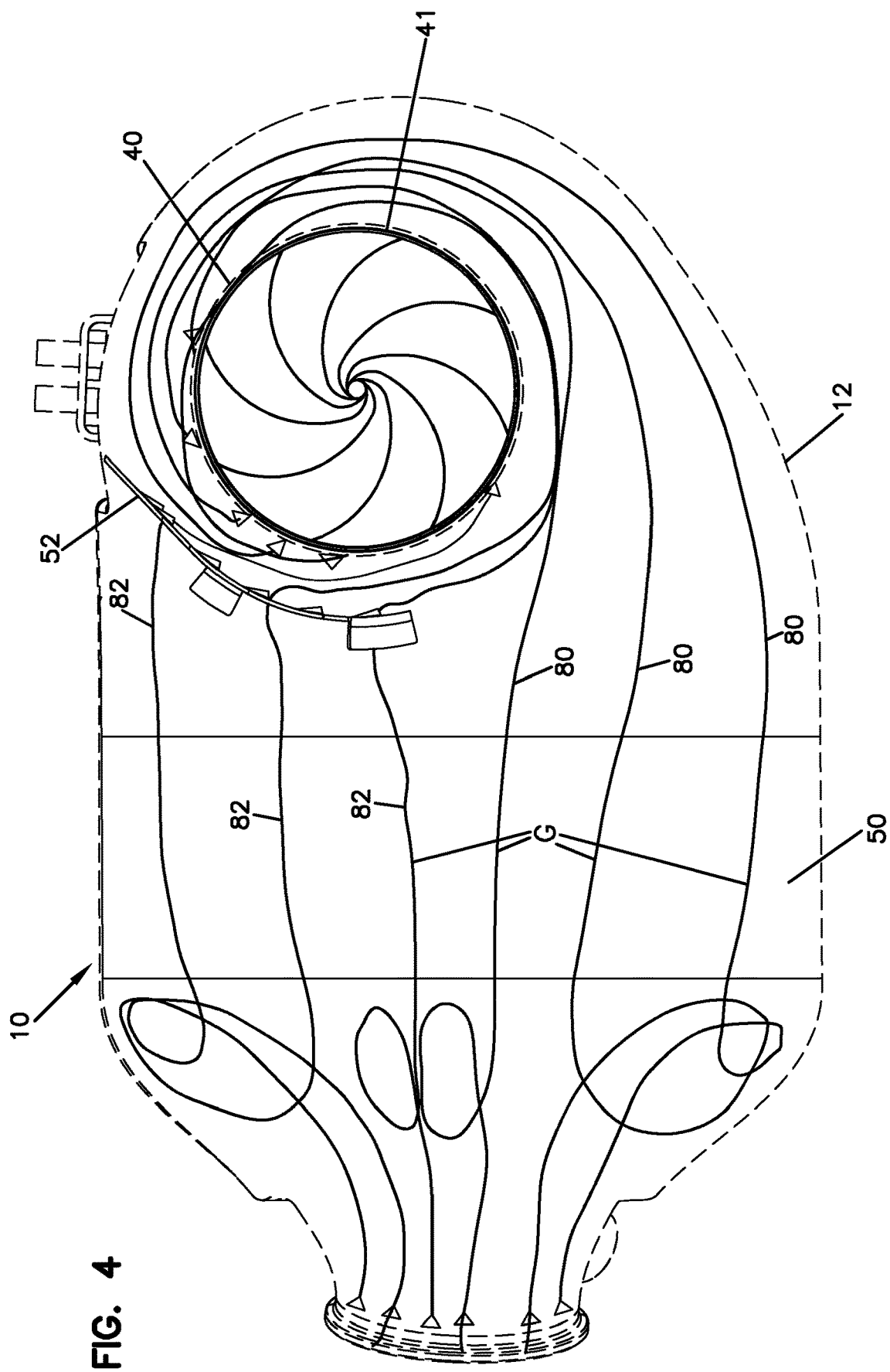
FIG. 4 shows exhaust gas flowing through the dosing and mixing unit of FIG. 3.
Figure 5:
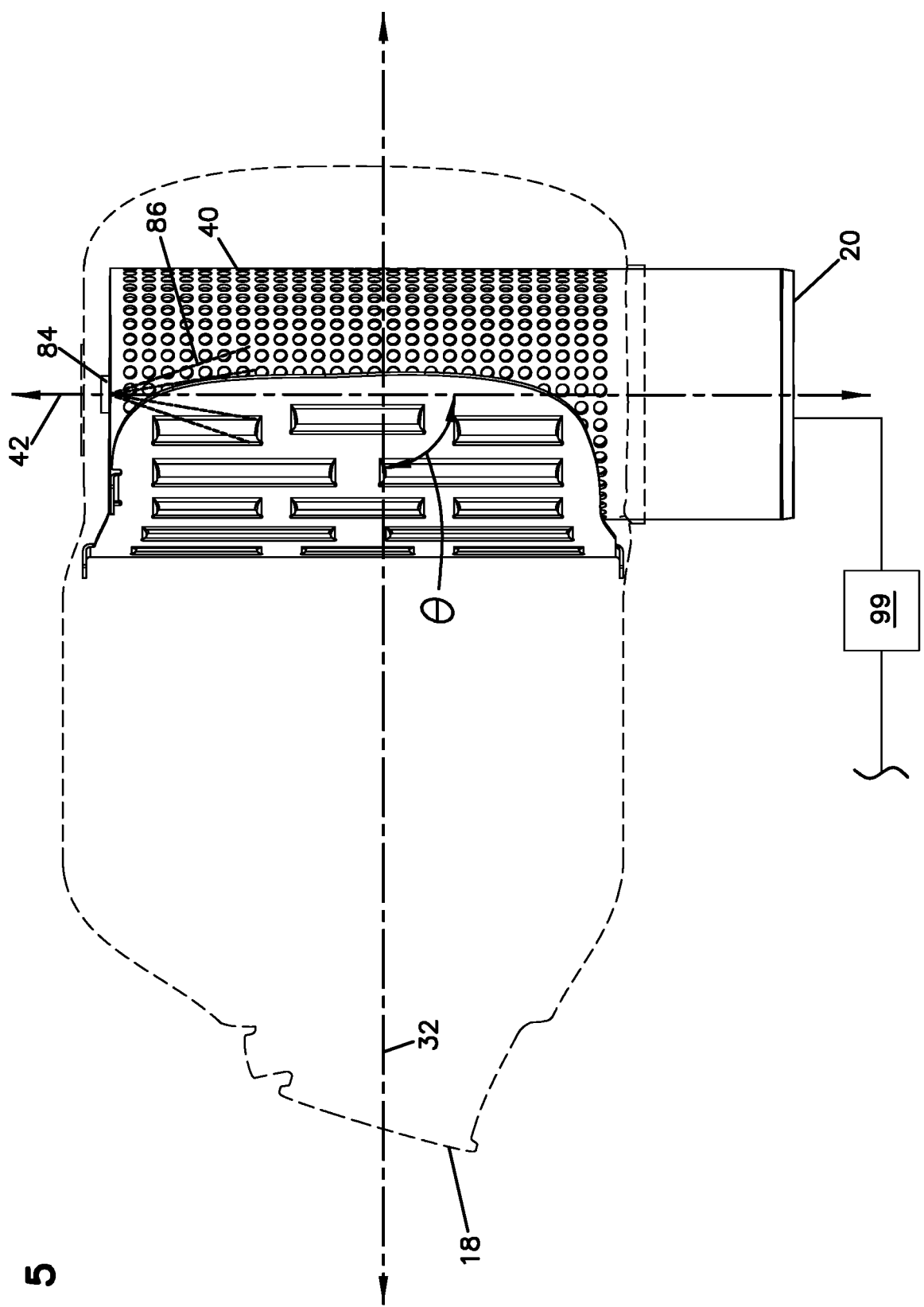
FIG. 5 is a top plan view of the exhaust gas flowing through the dosing and mixing unit of FIG. 3.

As shown in FIGS. 4 and 5, a first portion 80 of the exhaust gas G flowing through the housing 12 is directed though the open flow area A1 and then in the first rotational direction d around the perforated tube 40 (see FIGS. 4 and 5). The dosing and mixing unit 10 also is configured such that also a second portion 82 of the exhaust gas flow passes through the flow-through openings 60 and is deflected in the first rotation direction d about the perforated tube 40 by the louvers 62. In some implementations, the second portion 82 proceeds at least 180° in the first rotational direction d around the tube 40 before entering the tube 40 through the perforations. In certain implementations, the second portion 82 proceeds at least 270° in the first rotational direction d around the tube 40 before entering the tube 40 through the perforations. In one example embodiment, second portion 82 proceeds at least 360° in the first rotational direction d about the perforated tube 40 before entering the tube 40 through the perforations.

The main plate body 54 has a connected edge 64 that is connected to an interior of the main housing body 30. In some implementations, the main plate body 54 has a free edge 66 that extends across the interior volume V of the main housing body 30. In such implementations, the main plate body 54 is sized and shaped to coincide with only a portion of the transverse cross-sectional area A of the interior volume V such that an open flow area A1 (see FIG. 9) is defined between the free edge 66 and the interior of the main housing body 30. In some embodiments, the free edge 66 is generally parallel to the tube axis 42 (see FIG. 9). In other embodiments, the free edge 66 and the tube axis 42 can be angled relative to one another.

Figure 9:
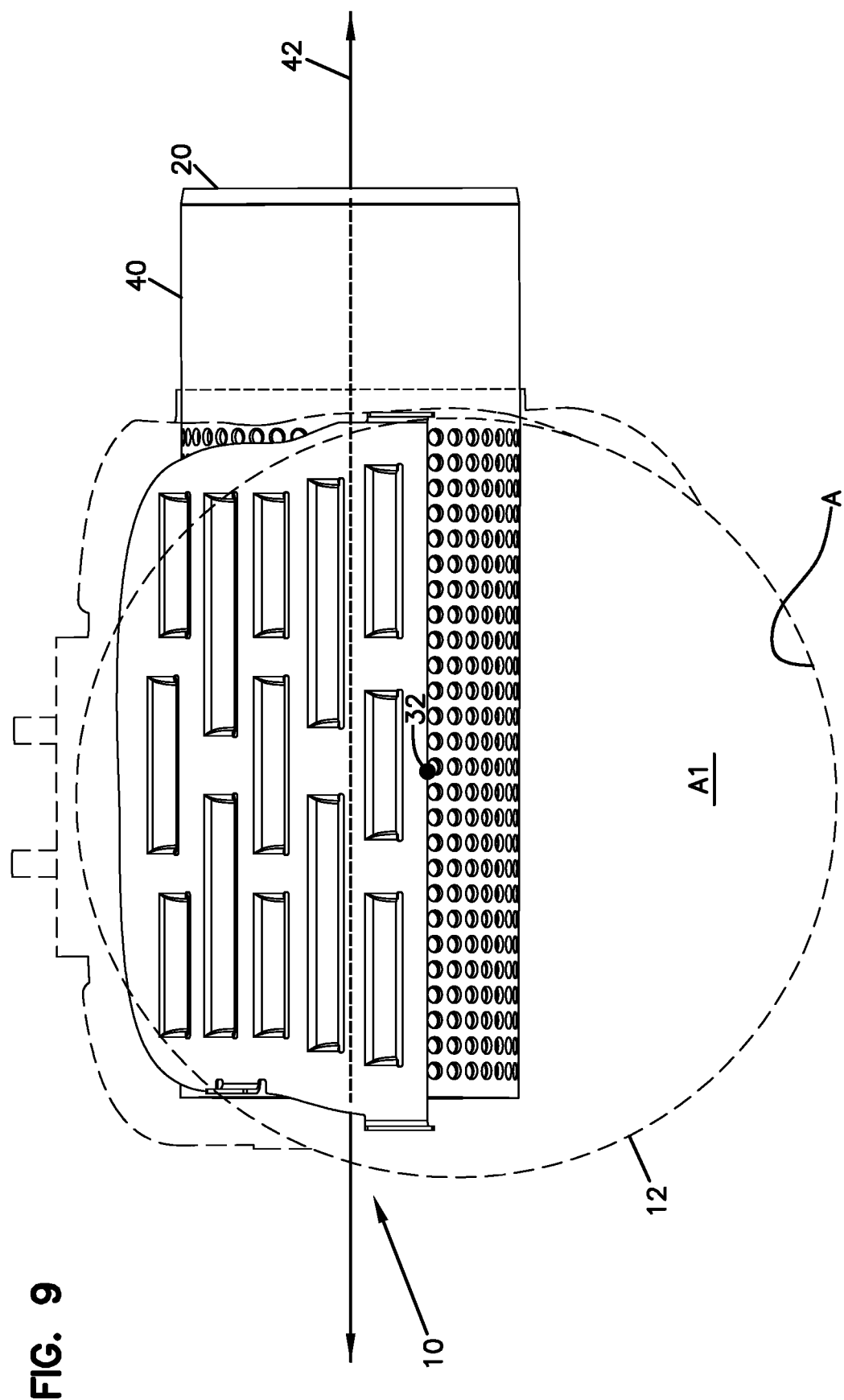
FIG. 9 is a cross-sectional view of the dosing and mixing unit of FIG. 2 taken along the 9-9 line of FIG. 3.

In some implementations, a portion of the perforated tube 40 extends below the free edge 66 of the baffle plate 52 and overlaps the open flow area A1 (see FIG. 9). In some implementations, between about 10% of the perforated tube 40 and about 50% of the perforated tube 40 overlaps the open flow area A1. In certain implementations, less than 40% of the perforated tube 40 overlaps the open flow area A1. In certain implementations, less than 33% of the perforated tube 40 overlaps the open flow area A1. In certain implementations, no less than 20% of the perforated tube 40 overlaps the open flow area A1. In certain implementations, no less than 25% of the perforated tube 40 overlaps the open flow area A1.

In other implementations, the main plate body 54 of the baffle 52 extends fully across the interior volume V of the main housing body 30. In such implementations, the main plate body 54 defines an aperture separate from the flow-through openings 60. The aperture extends over a significant portion of the surface area of the main plate body 54 to expose at least the portion of the cross-sectional area A located beneath the tube 40. In certain implementations, the aperture also may extend across a portion of the tube 40. For example, in some implementations, the aperture extends over about 10% to about 60% of the main plate body 54. In certain implementations, the aperture extends over about 20% to about 50% of the main plate body 54. In certain implementations, the aperture extends over no less than 30% and no more than 55% of the main plate body 54.

In still other implementations, first and second apertures can be defined in the main plate body 54 separate from the flow-through openings 60. The first aperture aligns with a portion of the perforated tube 40. The second aperture defines the open flow area (similar to open flow area A1 of FIG. 9). In certain implementations, the second aperture does not overlap with the perforated tube 40. In certain implementations, the first aperture extends over no more than 20% of the main plate body 54 and the second aperture extends over no more than 30% of the main plate body 54.

In some implementations, the dosing and mixing unit 10 also can include a reactant dispenser 84 for dispensing reactant 86 within an interior of the perforated tube 40 such that the reactant 86 is mixed with the exhaust gas flow within the interior of the perforated tube 40 (see FIG. 5). Examples of the reactant include, but are not limited to, ammonia, urea, or a hydrocarbon. In other embodiments, the reactant dispenser 84 may be positioned upstream from the perforated tube 40 or downstream from the perforated tube 40. The dispenser 84 can be aligned with the center axis 42 of the perforated tube 40 so as to generate a spray pattern concentric about the axis 42.

In some embodiments, a treatment substrate 99 is positioned downstream from the perforated tube 40 (see FIG. 5). Example treatment substrates 99 suitable for use with the tube 40 include, but are not limited to, a lean NOx catalyst substrate, a SCR substrate, a SCRF substrate (i.e., a SCR coating on a particulate filter), and a NOx trap substrate. In some embodiments, the treatment substrate is an SCR substrate for treating NOx and the reactant is selected from the group consisting of ammonia and urea.

A selective catalytic reduction (SCR) catalyst device is typically used in an exhaust system to remove undesirable gases such as nitrogen oxides (NOx) from the vehicle's emissions. SCR's are capable of converting NOx to nitrogen and oxygen in an oxygen rich environment with the assistance of reactants such as urea or ammonia, which are injected into the exhaust stream upstream of the SCR through the doser 84. In alternative embodiments, other aftertreatment devices such as lean NOx catalyst devices or lean NOx traps could be used in place of the SCR catalyst device, and other reactants (e.g., hydrocarbons) can be dispensed by the doser.

A lean NOx catalyst device is also capable of converting NOx to nitrogen and oxygen. In contrast to SCR's, lean NOx catalysts use hydrocarbons as reducing agents/reactants for conversion of NOx to nitrogen and oxygen. The hydrocarbon is injected into the exhaust stream upstream of the lean NOx catalyst. At the lean NOx catalyst, the NOx reacts with the injected hydrocarbons with the assistance of a catalyst to reduce the NOx to nitrogen and oxygen. While the exhaust treatment systems 400 and 500 will be described as including an SCR, it will be understood that the scope of the present disclosure is not limited to an SCR as there are various catalyst devices that can be used in accordance with the principles of the present disclosure.

The lean NOx traps use a material such as barium oxide to absorb NOx during lean burn operating conditions. During fuel rich operations, the NOx is desorbed and converted to nitrogen and oxygen by reaction with hydrocarbons in the presence of catalysts (precious metals) within the traps.

In other implementations, the dosing and mixing unit 10 can be used to mix hydrocarbons with the exhaust to reactivate a diesel particulate filter (DPF). In such implementations, the reactant dispenser 84 injects hydrocarbons into the gas flow within the perforated tube 40. The mixed gas leaves the tube 40 and is directed to a downstream diesel oxidation catalyst (DOC) at which the hydrocarbons ignite to heat the exhaust gas. The heated gas is then directed to the DPF to burn particulate clogging the filter.

Figure 10:
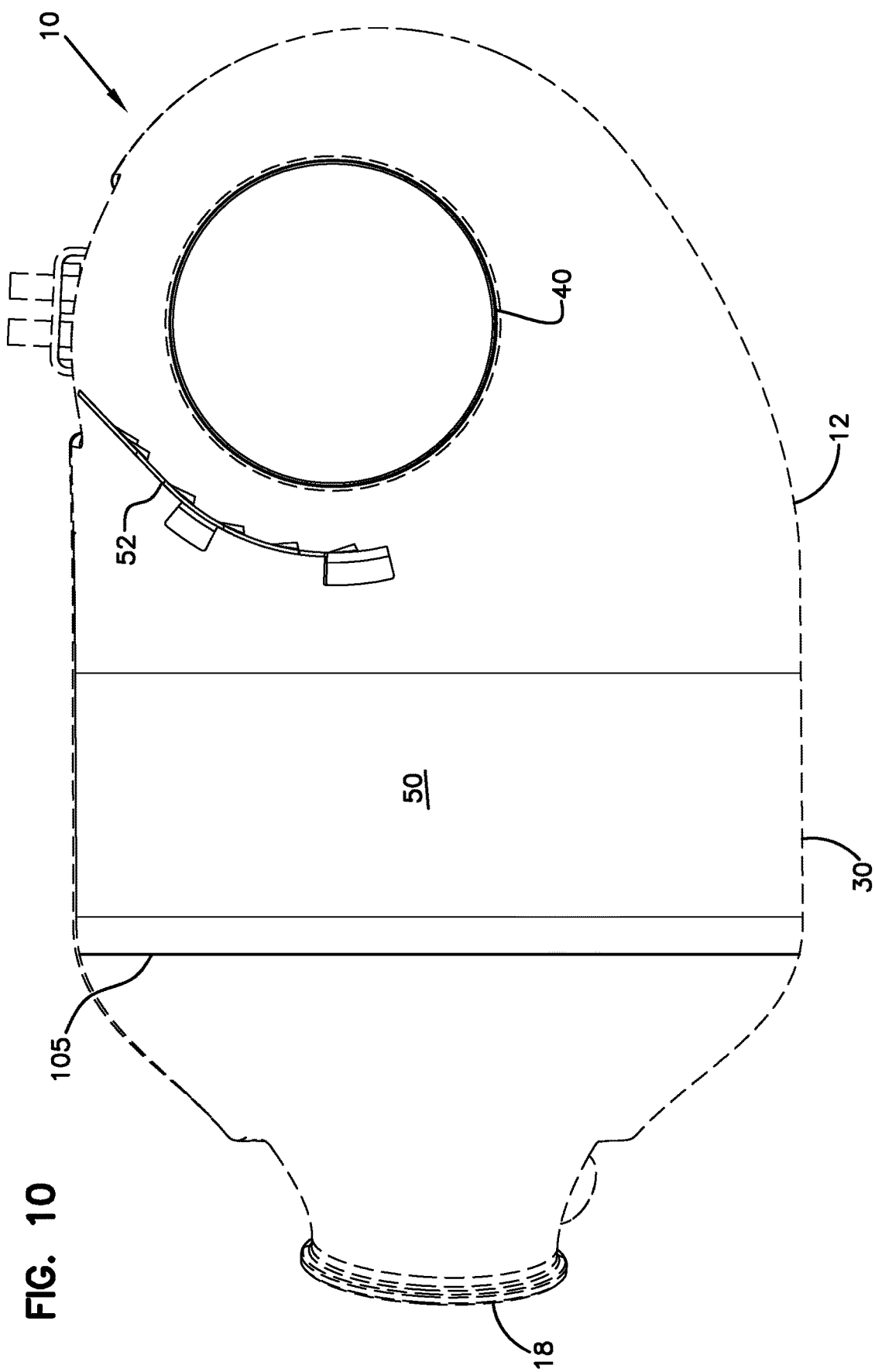
FIG. 10 is a side view of the dosing and mixing unit of FIG. 2 with a perforated plate disposed between the inlet and the treatment substrate.
Figure 11:
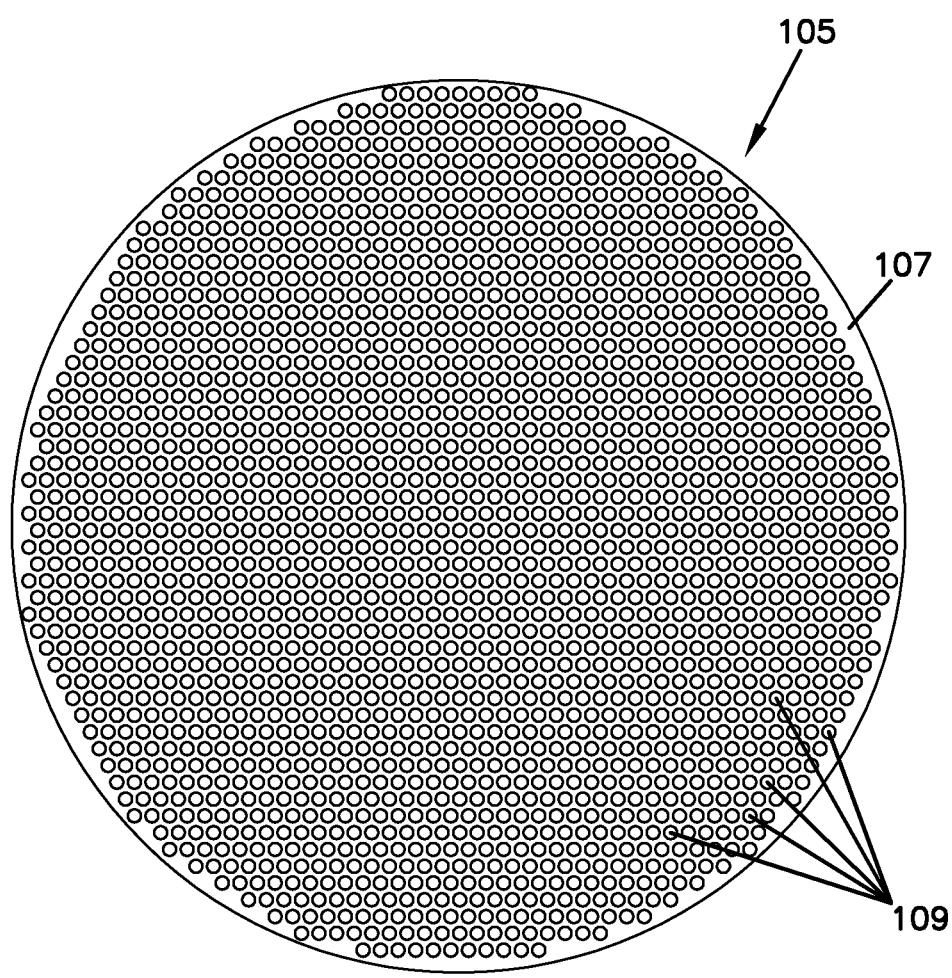
FIG. 11 is a front view of an example perforated suitable for use in the dosing and mixing unit of FIG. 10.
Figure 12:
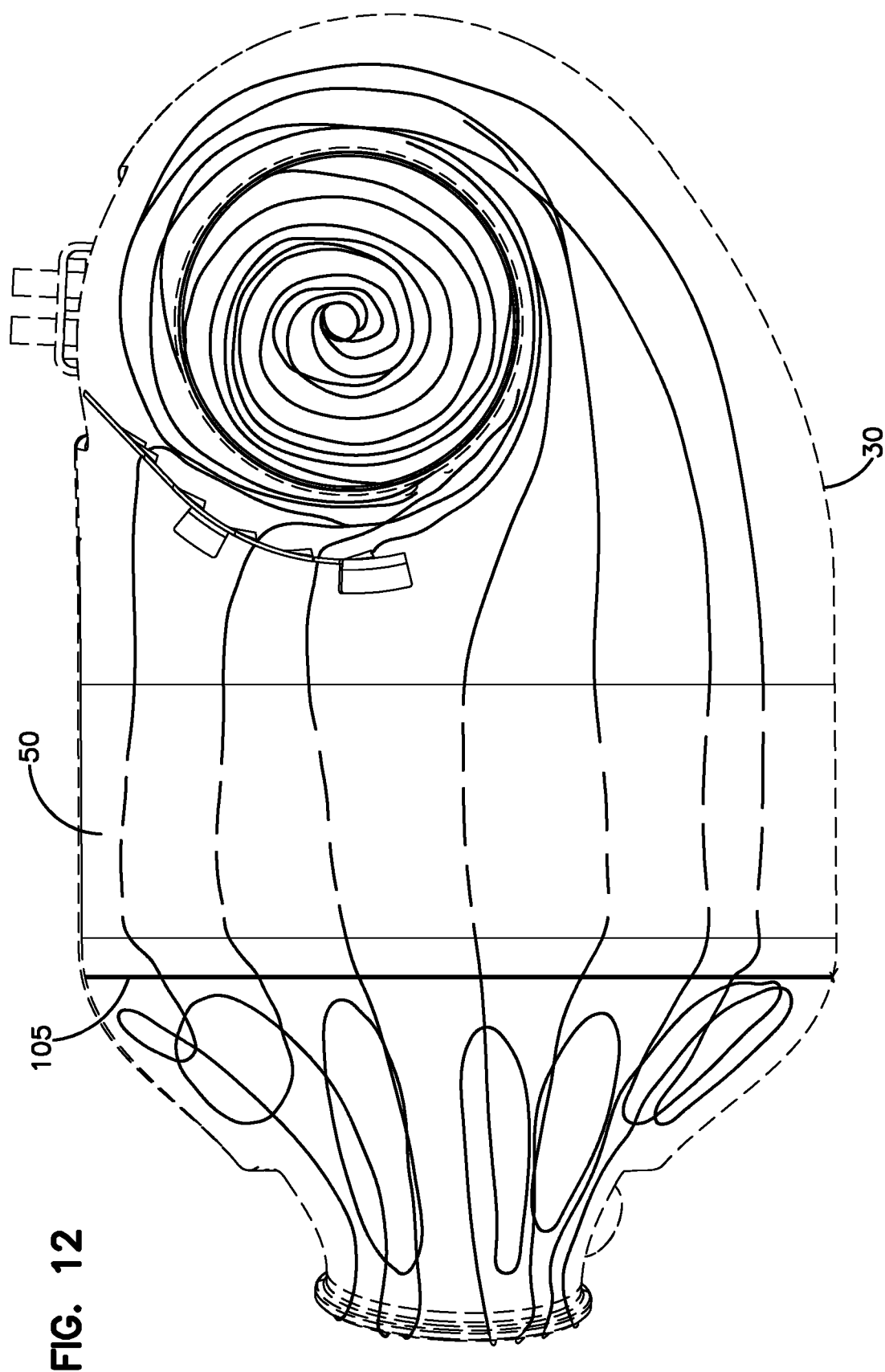
FIG. 12 shows exhaust gas flowing through the dosing and mixing unit of FIG. 10.

As shown in FIGS. 10 and 11, some examples of the dosing and mixing unit 10 also can include a perforated plate 105 positioned within the main housing body 30 of the dosing and mixing unit 10. In some embodiments, the perforated plate 105 is positioned between the inlet 18 and the exhaust treatment substrate 50. In some examples, the perforated plate 105 includes a flat plate body 107 having a plurality of apertures 109 to distribute the exhaust gas G within the main housing body 30 before the gas reaches the exhaust treatment substrate 50 (FIG. 12). In other examples, other types of flow distribution devices can be utilized. In still other examples, no devices are positioned between the inlet 18 and the exhaust treatment substrate 50.

In use of the dosing and mixing unit 10, exhaust enters the housing 12 of the dosing and mixing unit 10 through the inlet 18 into the main housing body 30. From the inlet 18, the exhaust flow G moves through the perforated plate 105 (if utilized), through the substrate 50, and into the interior volume V of the housing body 30 (see FIG. 4). At the interior volume V, the first portion 80 of the exhaust gas G flows past the free edge 66 of the main body 54 of the baffle plate 52 and through the open area A1. Upon passing through the open area A1, the first portion 80 of the exhaust flow G is directed toward the curved portion 46 of the housing 12, which encourages the first portion 80 of the exhaust flow to flow in the first rotational direction d around a first side 41 (see FIG. 3) of the perforated tube 40. In certain implementations, some of the gas flow G can initially deflect off the upstream side 56 of the main body 54 of the baffle plate 52 towards the free edge 66.

The second portion 82 of the exhaust gas flow G flows through the flow-through openings 60 of the baffle plate 52 from the upstream side 56 of the main body 54 to the downstream side 58 of the main body 56. The second portion 82 of the exhaust gas flow G is deflected at the downstream side 58 of the main body 54 with the louvers 62. This deflection causes the second portion 82 of the exhaust gas flow G to flow in the first rotational direction d around a second side 43 (see FIG. 3) of the perforated tube 40. The first and second sides 41, 43 are opposite sides of the perforated tube 40. As shown in FIG. 4, the exhaust gas (the combination of the first and second portions 80, 82) flows at least 270 degrees (preferably about 360 degrees) in the first direction d about the perforated tube 40.

The exhaust gas G swirling about the perforated tube 40 in the first rotational direction d enters the openings in the perforated tube 40 and continues to swirl in the first rotational direction d within the perforated tube 40. The reactant dispenser 84 (see FIG. 5) dispenses reactant 86 into the swirling exhaust flow within the perforated tube 40. The swirling of the exhaust gas causes the reactant 86 to be mixed with the exhaust gas within the perforated tube 40. The exhaust flow then exits the housing 12 through the outlet 18 defined by the perforated tube 40 and proceeds to the downstream exhaust treatment substrate 99 (see FIG. 5). Mixing can continue as the exhaust gas flows from the perorated tube 40 to the substrate 99.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A dosing and mixing arrangement comprising:
   a main body extending along a length between first and second opposite ends of the main body, the main body defining a longitudinal axis extending between the first and second ends, the main body also defining an interior accessible through an inlet;
   an outlet pipe extending through the main body at a location adjacent the second end of the main body, the outlet pipe extending in a direction transverse to the longitudinal axis of the main body;
   a mixing region disposed within the interior of the main body, the mixing region including a perforated conduit that extends transverse to the longitudinal axis of the main body, the perforated conduit defining multiple openings disposed along a circumference of the perforated conduit, the mixing region also including a flow path extending around the perforated conduit and leading into the perforated conduit through the multiple openings; and
   a baffle arrangement disposed within the interior of the main body, the baffle arrangement defining a first entrance to the flow path, the baffle arrangement also defining a second entrance to the flow path, the second entrance being spaced along the flow path from the first entrance.

2. The dosing and mixing arrangement of claim 1, wherein the baffle arrangement includes a curved baffle plate having at least a portion extending between the perforated conduit and the inlet.

3. The dosing and mixing arrangement of claim 2, wherein the first entrance is defined by a first aperture extending through the curved baffle plate and the second entrance is defined by a second aperture extending through the curved baffle plate.

4. The dosing and mixing arrangement of claim 1, wherein the outlet pipe is coupled to the perforated conduit.

5. The dosing and mixing arrangement of claim 4, wherein the outlet pipe is a first section of a tube and the perforated conduit is a second section of the tube.

6. The dosing and mixing arrangement of claim 4, wherein the outlet pipe has a constant diameter along a length of the outlet pipe, the length of the outlet pipe extending transverse to the longitudinal axis of the main body.

7. The dosing and mixing arrangement of claim 1, wherein the perforated conduit has a constant diameter along a length of the perforated conduit, the length of the perforated conduit extending transverse to the longitudinal axis of the main body.

8. The dosing and mixing arrangement of claim 1, wherein the baffle arrangement includes a first curved surface positioned at the first entrance and a second curved surface positioned at the second entrance.

9. The dosing and mixing arrangement of claim 8, wherein both the first and second curved surfaces direct exhaust flow in a common direction along the flow path.

10. The dosing and mixing arrangement of claim 1, wherein the baffle arrangement includes a curved baffle plate extending partially along the perforated conduit, and wherein an open flow area is defined between the curved baffle plate and an opposing surface of the main body.

11. The dosing and mixing arrangement of claim 10, wherein the first entrance leads to a portion of the flow path extending between the curved baffle plate and the perforated conduit, and wherein the open flow region defines the second entrance.

12. The dosing and mixing arrangement of claim 1, further comprising a substrate disposed within the interior of the main body and along a flow path between the inlet and the perforated conduit.

13. The dosing and mixing arrangement of claim 1, further comprising a reactant dispenser location disposed at an end of the perforated conduit.

14. The dosing and mixing arrangement of claim 13, wherein the reactant dispensing location is aligned with a central longitudinal axis of the perforated conduit, the central longitudinal axis extending through the outlet pipe.

15. The dosing and mixing arrangement of claim 13, further comprising a reactant dispenser mounted at the reactant dispenser location.

16. The dosing and mixing arrangement of claim 1, wherein the inlet is disposed at the first end of the main body, wherein the longitudinal axis of the main body extends through the inlet.

17. The dosing and mixing arrangement of claim 1, wherein the multiple openings are disposed along a length of the perforated conduit.

18. A dosing and mixing arrangement comprising:
a main body extending along a length between first and second opposite ends of the main body, the main body defining a longitudinal axis extending between the first and second ends, the main body also defining an interior accessible through an inlet;
an outlet pipe extending through the main body at a location adjacent the second end of the main body, the outlet pipe extending in a direction transverse to the longitudinal axis of the main body;
a mixing region disposed within the interior of the main body, the mixing region including a perforated conduit that extends transverse to the longitudinal axis of the main body, the mixing region also including a flow path extending around the perforated conduit and leading into the perforated conduit; and
a baffle arrangement disposed within the interior of the main body, the baffle arrangement defining a first entrance to the flow path, the baffle arrangement also defining a second entrance to the flow path, the second entrance being spaced along the flow path from the first entrance, the baffle arrangement including a curved baffle plate spaced from the perforated conduit so that the flow path passes through an open flow area disposed between at least a portion of the baffle arrangement and an opposing surface of the perforated conduit.

19. The dosing and mixing arrangement of claim 18, wherein the first entrance leads to a portion of the flow path extending between the curved baffle plate and the opposing surface of the perforated conduit, and wherein the open flow area defines the second entrance.

20. A dosing and mixing arrangement comprising:
a main body extending along a length between first and second opposite ends of the main body, the main body defining a longitudinal axis extending between the first and second ends, the main body also defining an interior accessible through an inlet;
an outlet pipe extending through the main body at a location adjacent the second end of the main body, the outlet pipe extending in a direction transverse to the longitudinal axis of the main body;
a mixing region disposed within the interior of the main body, the mixing region including a perforated conduit that extends transverse to the longitudinal axis of the main body, the perforated conduit defining multiple openings, the mixing region also including a flow path extending around the perforated conduit and leading into the perforated conduit through the multiple openings; and
a baffle arrangement disposed within the interior of the main body, the baffle arrangement defining a first entrance to the flow path, the baffle arrangement also defining a second entrance to the flow path, the second entrance being spaced along the flow path from the first entrance, wherein the baffle arrangement includes a curved baffle plate having at least a portion extending between the perforated conduit and the inlet.

21. A dosing and mixing arrangement comprising:
a main body extending along a length between first and second opposite ends of the main body, the main body defining a longitudinal axis extending between the first and second ends, the main body also defining an interior accessible through an inlet;
an outlet pipe extending through the main body at a location adjacent the second end of the main body, the outlet pipe extending in a direction transverse to the longitudinal axis of the main body;
a mixing region disposed within the interior of the main body, the mixing region including a perforated conduit that extends transverse to the longitudinal axis of the main body, the perforated conduit defining multiple openings, the mixing region also including a flow path extending around the perforated conduit and leading into the perforated conduit through the multiple openings; and
a baffle arrangement disposed within the interior of the main body, the baffle arrangement defining a first entrance to the flow path, the baffle arrangement also defining a second entrance to the flow path, the second entrance being spaced along the flow path from the first entrance, wherein the baffle arrangement includes a first curved surface positioned at the first entrance and a second curved surface positioned at the second entrance.

22. A dosing and mixing arrangement comprising:
a main body extending along a length between first and second opposite ends of the main body, the main body defining a longitudinal axis extending between the first and second ends, the main body also defining an interior accessible through an inlet;
an outlet pipe extending through the main body at a location adjacent the second end of the main body, the outlet pipe extending in a direction transverse to the longitudinal axis of the main body;
a mixing region disposed within the interior of the main body, the mixing region including a perforated conduit that extends transverse to the longitudinal axis of the main body, the perforated conduit defining multiple openings, the mixing region also including a flow path extending around the perforated conduit and leading into the perforated conduit through the multiple openings; and
a baffle arrangement disposed within the interior of the main body, the baffle arrangement defining a first entrance to the flow path, the baffle arrangement also defining a second entrance to the flow path, the second entrance being spaced along the flow path from the first entrance, wherein the baffle arrangement includes a curved baffle plate extending partially along the perforated conduit, and wherein an open flow area is defined between the curved baffle plate and an opposing surface of the main body.

* * * * *